United States Patent Office 3,174,961
Patented Mar. 23, 1965

3,174,961
AZO-DYESTUFFS
Karl Ronco, Muttenz, Switzerland, assignor to Ciba Limited, Basel, Switzerland, a company of Switzerland
No Drawing. Filed Dec. 28, 1961, Ser. No. 162,938
Claims priority, application Switzerland, Jan. 6, 1961, 151/61
6 Claims. (Cl. 260—203)

This invention provides azo-dyestuffs which are free from groups imparting solubility in water, especially sulfonic acid, carboxylic acid or carboxylic acid amide groups, and correspond to the general formula (1) 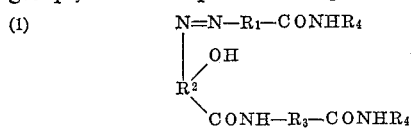

in which $R_1$ and $R_3$ represent benzene or naphthalene radicals, $R_4$ represents an aryl radical, and $R_2$ represents a naphthalene radical in which the azo, hydroxyl and carboxylic acid amide groups are in the 1-, 2- and 3-positions, respectively. The invention also provides a process for the manufacture of the above azo-dyestuffs, wherein 1 molecular proportion of a dicarboxylic acid halide which is free from groups imparting solubility in water and has the formula (2) 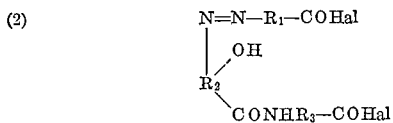

in which $R_1$, $R_2$ and $R_3$ have the meanings given above, and especially one of the formula (3) 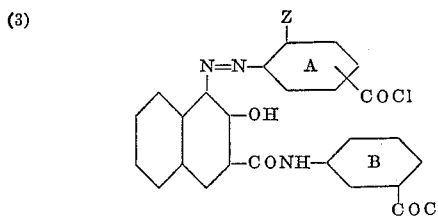

in which Z represents an alkoxy, alkyl or a substituted phenoxy group or a halogen atom, and in which the benzene radicals A and B may be further substituted and the carboxylic acid chloride group in ring A is in meta- or para-position to the azo group, is condensed with 2 molecular proportions of an aromatic monoamine which is free from groups imparting solubility in water.

The azo-dicarboxylic acids, from which the acid halides of Formula 2 are prepared, are obtained by coupling a diazo-compound of an aminobenzoic acid or aminonaphthoic acid with a compound of the formula (4) 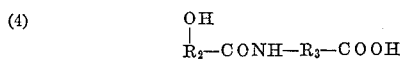

in which $R_2$ and $R_3$ have the meanings given above. Examples of such aminobenzoic acids are para- or especially meta-aminobenzoic acids, preferably those containing a substituent, for example, a halogen atom or an alkoxy group, in ortho-position to the amino group. Examples are: meta-aminobenzoic acid, 4-chloro-3-aminobenzoic acid, 4-methoxy-3-aminobenzoic acid, 5-amino-2:4-dichlorobenzoic acid, 4 - (para-chloro)-phenoxy-3-aminobenzoic acid, 4-amino-3-nitrobenzoic acid and 4-methyl-3-aminobenzoic acid. The coupling components of Formula 4 can be obtained, for example, by condensing a 2:3-hydroxynaphthoic acid halide with an aminobenzoic acid. The 2:3-hydroxynaphthoic acid halide may be substituted in the 6-position of the benzene ring not containing the carboxylic acid group by, for example, a halogen atom, especially a bromine atom, or by an alkoxy or alkyl group. However, it is preferable to use 2:3-hydroxynaphthoic acid chloride itself on account of its easy availability.

The aminobenzoic acid or aminonaphthoic acid of the formula $H_2N-R_3-COOH$ to be condensed therewith, advantageously contains the amino group in meta- or para-position to the carboxylic group, and may contain further substituents, such as halogen atoms or alkoxy or nitro groups. Exmples are: para- or meta-aminobenzoic acid, 3- amino - 4:6 - dichlorobenzoic acid, 3 - amino - 4-methoxybenzoic acid and 4-amino-3-nitrobenzoic acid.

The azo-dicarboxylic acids so obtained are treated with an agent which is capable of converting carboxylic acids into their halides, for example, their chlorides or bromides, especially a phosphorus halide, such as phosphorus pentabromide or phosphorus trichloride or pentachloride, a phosphorus oxyhalide or preferably thionyl chloride.

The treatment with such acid-halogenating agents is advantageously carried out in an inert organic solvent, such as dimethyl-formamide, a chlorobenzene, for example, mono- or di-chlorobenzene, or toluene, xylene or nitrobenzene, the five last mentioned solvents being used, if desired, together with dimethyl-formamide.

In preparing the carboxylic acid halides it is generally of advantage first to dry the azo-compounds, since they have been prepared in an aqueous medium, or to free them from water azeotropically by boiling them in an organic solvent. If desired, this azeotropic drying may be carried out immediately before treatment with the acid-halogenating agent.

In the process of the invention, the dicarboxylic acid halides so obtained are condensed with aromatic monoamines in the molar ratio 1:2. Examples of aromatic monoamines are 1- or 2- naphthylamines, 1 - amino-5:8-dichloronaphthalene, 2-amino-6-methoxy- or 2-amino-6-bromonaphthalene, and especially amino-benzenes, for example, 1-amino-2:5-dichlorobenzene, 1-amino-2:4:5-trichlorobenzene or 1-amino-2-methoxy-5-nitrobenzene. Of special interest are monobenzoylated diaminobenzenes especially those having the formula (5) 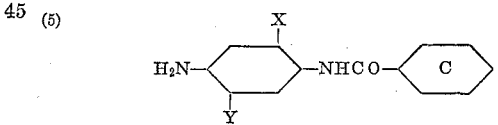

in which X and Y represent hydrogen atoms or alkyl or alkoxy groups containing 1 or 2 carbon atoms, or especially halogen atoms, for example, bromine or preferably chlorine, and in which the benzene nucleus C may be further substituted. Examples are: 1-amino-4-benzoylaminobenzene, 1 - amino-4-(para-chlorobenzoylamino)-benzene, 1 - amino-4-(para-methoxybenzoyl)-aminobenzene, 1-amino-2-chloro-4-benzoylaminobenzene, 1-amino-2:5 - dichloro-4-benzoylaminobenzene, 1-amino-2-methoxy-5-chloro-4-benzoylaminobenzene, and 1-amino-2:5-dimethyl-4-benzoylaminobenzene. A mixture of different acid chlorides within the above definition may be condensed with the same monoamine, whereby the tint of the dyestuff can be modified.

The condensation of the aforesaid carboxylic acid halides with the amines is advantageously carried out in an anhydrous medium. In this case the condensation takes place surprisingly easily, even at temperatures within the boiling range of normal organic solvents, such as toluene, monochlorobenzene, dichlorobenzene, trichlorobenzene, nitrobenzene or the like. It is of advantage to use an agent capable of binding acid, such as anhydrous sodium acetate or pyridine, in order to accelerate the reaction. Some of the dyestuffs so obtained are crystalline and others are amorphous, and they are generally obtained in a very good yield and in a pure state. It is of advantage first to isolate the acid chlorides obtained from the carboxylic acids. In some cases, however, the isolation of the acid chlorides may be dispersed with without harm, and condensation carried out immediately following the formation of the carboxylic acid chlorides.

The new dyestuffs of the invention are valuable new pigments which, by virtue of their insolubility in organic solvents and their resistance to heat, are very suitable for coloring plastics, principally red tints. They possess excellent fastness to light and migration. Apart from using them for coloring plastics, the pigments of the invention can also be used for pigment printing that is to say, for printing processes in which a pigment is fixed on a substratum, particularly a textile fabric or another sheet-like substratum, such as paper (e.g., wallpaper) or a fabric of glass-fibers, with a suitable adhesive, such as casein, a thermo-setting resin, particularly a urea- or melamine-formaldehyde condensation product, or solutions or emulsions of polyvinyl chloride or polyvinyl acetate, or other emulsions (e.g., oil-in-water or water-in-oil emulsions). The pigments can also be used in a finely divided form for the spin-dyeing of rayon or viscose or cellulose ethers or esters or polyamides or polyurethanes, and also for the manufacture of colored lacquers or lacquer-formers, solutions or products of acetyl-cellulose, nitrocellulose, natural or synthetic resins, such as polymerization or condensation resins, for example, aminoplasts, phenoplasts, polystyrene, polyethylene, polypropylene, polyacrylates, rubber, casein, silicone or silicone resins. They can also be used in the manufacture of colored pencils, cosmetic preparations or laminated sheet material.

Preparations which contain such pigments in a finely divided form can be produced in known manner by intense mechanical treatment, for example, on a roller mill or in a suitable kneading apparatus. The dispersing medium in which they are subjected to the intensive mechanical treatment, is chosen to suit the preparation to be made, for example, sulfite cellulose waste liquor or a salt of dinaphthyl-methane disulfonic acid is used for the manufacture of preparations that are to be dispersible in water, and acetyl cellulose mixed with a little solvent is used for the production of compositions for spinning cellulose acetate rayon.

Owing to the especially favorable physical form in which the pigments of this invention are obtained, and by virtue of their chemical inertness and good heat resistance, they can be easily dispersed in the usual manner in the aforesaid masses and preparations, and this is advantageously carried out at a stage before the said masses or preparations have reached their final form. The operations required for giving the products their final form, such as spinning, pressing, hardening, casting, cementing and the like can easily be carried out in the presence of these pigments without interfering with any chemical reactions of the substratum, such as further polymerization, condensation, or the like.

The following examples illustrate the invention, the parts and percentages being by weight:

Example 1

49 parts of the monoazo-dyestuff, obtained by coupling diazotized 4-chloro-3-aminobenzoic acid with 2-hydroxy-3-naphthoic acid (3'-carboxy)-phenylamide, are heated at 120–130° C. for 1 hour with 1000 parts of orthodichlorobenzene, 25 parts of thionyl chloride and 5 parts of dimethyl-formamide.

After cooling the reaction mixture, the dicarboxylic acid chloride, which has precipitated in the form of thin red needles, is filtered off, washed with benzene and dried in vacuo at 50° C.

26.5 parts of the dicarboxylic acid chloride are added to 1000 parts of ortho-dichlorobenzene at 100° C., while stirring. 30 parts of 2:5-dichloro-4-benzoylamino-1-aminobenzene in 500 parts of ortho-dichlorobenzene are poured in, and the whole is heated at 140–145° C. for 16 hours. The precipitated crystalline pigment is filtered at 120° C., washed with hot ortho-dichlorobenzene, hot benzene and methanol, and dried at 70–80° C. in vacuo. A soft-grained red powder is obtained which colors polyvinyl chloride foils a bright scarlet tint which is fast to light and migration.

The product thus obtained has the formula

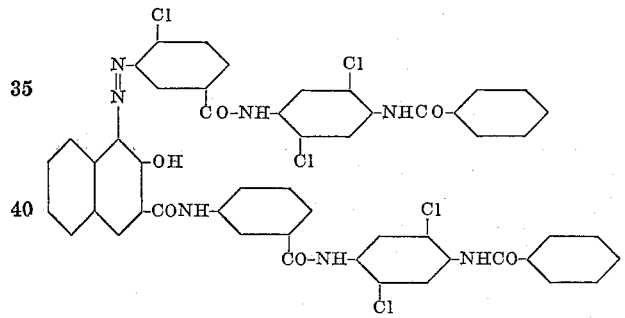

In a manner analogous to that described in Example 1 the azo-dyestuff dicarboxylic acids, obtained from the diazo-components, $H_2N-R_1-COOH$, in column I of the following table and the coupling components,

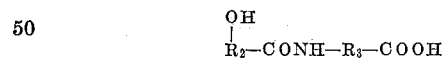

in column II are reacted in the form of their dicarboxylic acid chlorides with 2 molecular proportions of the aromatic amines in column OIII. Column IV gives the colors produced with the pigments in polyvinyl chloride foils.

| No. | I | II | III | IV |
|---|---|---|---|---|
| 1 | 4-chloro-3-amino-benzoic acid. amide. | 2-hydroxy-3-naphthoic acid (3'-carboxy)-phenyl-amide. | 2:5-dimethyl-4-benzoyl-amino-1-aminobenzene. | Scarlet. |
| 2 | ----do---- | ----do---- | 2:5-dimethoxy-4-benzoyl-amino-1-aminobenzene. | Red. |
| 3 | 4-methoxy-3-amino benzoic acid. | 2-hydroxy-3-naphthoic acid (3'-carboxy-6'-chloro)-phenylamide. | 2:5-dichloro-4-benzoyl-amino-1-aminobenzene. | Ruby. |
| 4 | ----do---- | ----do---- | 2-methyoxy-5-chloro-4-benzoylamino-1-amino-benzene. | Do. |
| 5 | ----do---- | 2-hydroxy-3-naphthoic acid (3'-carboxy-6'-methoxy)-phenylamide. | 2:5-dichloro-4-benzoyl-amino-1-aminobenzene. | Do. |
| 6 | 4-chloro-3-amino benzoic acid. | 2-hydroxy-3-naphthoic acid (4'-carboxy)-phenyl-amide. | 2:5-dimethyl-4-benzoyl-amino-1-aminobenzene. | Orange. |
| 7 | ----do---- | ----do---- | 2:5-dichloro-4-benzoyl-amino-1-aminobenzene. | Do. |
| 8 | 5-amino-2:4-dichloro-benzoic acid. | 2-hydroxy-3-naphthoic acid (3'-carboxy-4:6'-dichloro) phenylamide. | 2:5-dichloro-4-benzoyl-amino-1-aminobenzene. | Scarlet. |
| 9 | 2:4-dichloro-5-amino-benozic acid. | 2-hydroxy-3-naphthoic acid (3'-carboxy)-phenyl-amide. | 2:5-dichloro-4-benzoyl-amino-1-aminobenzene. | Orange. |

| No. | I | II | III | IV |
|---|---|---|---|---|
| 10 | 4-chloro-3-amino-benzoic acid. | 2-hydroxy-3-naphthoic acid (3'-carboxy-6'-methoxy)-phenylamide. | 2:5-dichloro-4-benzoyl-amino-1-aminobenzene. | Scarlet. |
| 11 | ___do___ | 2-hydroxy-3-naphthoic acid (2'-nitro-4'-carboxy)-phenylamide. | ___do___ | Do. |
| 12 | 3-aminobenzoic acid | 2-hydroxy-3-naphthoic acid (3'-carboxy)-phenylamide. | ___do___ | Do. |
| 13 | 4-amino-3-nitro-benzoic acid. | 2-hydroxy-3-naphthoic acid (3'-carboxy)-phenylamide. | ___do___ | Yellow-orange. |
| 14 | ___do___ | 2-hydroxy-3-naphthoic acid (2'-nitro-4'-carboxy)-phenylamide. | ___do___ | Orange. |
| 15 | 4-methoxy-3-amino-benzoic acid. | 2-hydroxy-3-naphthoic acid (3'-carboxy)-phenylamide. | 2:5-dichloro-4-benzoylamino-1-aminobenzene. | Ruby. |
| 16 | 4-methoxy-3-amino-benzoic acid. | 2-hydroxy-3-naphthoic acid (3'-carboxy)-phenylamide. | 2:5-dichloro-4-(4'-chloro)-benzoyl-amino-1-aminobenzene. | Do. |
| 17 | ___do___ | 2-hydroxy-3-naphthoic acid (3'-carboxy-6'-methyl)-phenylamide. | 2:5-dichloro-4-benzoyl-amino-1-aminobenzene. | Do. |
| 18 | 4-ethoxy-3-amino-benzoic acid. | 2-hydroxy-3-naphthoic acid (3'-carboxy)-phenylamide. | ___do___ | Do. |
| 19 | ___do___ | ___do___ | 2:5-dichloro-4-(4'-chloro)-benzoylamino-1-aminobenzene. | Do. |
| 20 | 4-methoxy-3-amino-benzoic acid. | 2-hydroxy-3-naphthoic acid 6-bromo-(3'-carboxy)-phenylamino. | 2:5-dichloro-4-(4'-chloro)-benzoylamino-1-aminobenzene. | Red-violet. |
| 21 | 4-chloro-3-amino-benzoic acid. | 2-hydroxy-3-naphthoic acid (3'-carboxy)-phenylamide. | ___do___ | Scarlet. |
| 22 | 4-bromo-3-amino-benzoic acid. | 2-hydroxy-3-naphthoic acid-(3'-carboxy)-phenylamide. | 2:5-dichloro-4-benzoylamino-1-aminobenzene. | Red. |
| 23 | ___do___ | ___do___ | 2:5-dichloro-4-(4'-chloro)-benzoylamino-1-aminobenzene. | Do. |
| 24 | 4-(4'-chloro)-phenoxy-3-amino-benzoic acid. | ___do___ | 2:5-dichloro-4-benzoylamino-1-aminobenzene. | Scarlet. |
| 25 | ___do___ | ___do___ | 2:5-dichloro-4-(4'-chloro)-benzoylamino-1-aminobenzene. | Do. |
| 26 | ___do___ | ___do___ | 2:5-dimethoxy-4-benzoylamino-1-aminobenzene. | Do. |
| 27 | ___do___ | ___do___ | 2:5-dichloro-4-acetylamino-1-aminobenzene. | Do. |
| 28 | 4-amino-3-nitrobenzoic acid. | 2-hydroxy-3-naphthoic acid (3'-carboxy-6'-chloro)-phenylamide. | 2:5-dichloro-4-benzoylamino-1-aminobenzene. | Yellow-orange. |
| 29 | ___do___ | ___do___ | 2:5-dichloro-4-(4'-chloro)-benzoylamino-1-1-aminobenzene. | Orange. |
| 30 | ___do___ | ___do___ | 2:5-dichloro-4-(2':4'-dichloro)-benzoylamino-1-aminobenzene. | Do. |
| 31 | ___do___ | ___do___ | 2:5-dichloro-4-(2'-chloro)-benzoylamino-1-aminobenzene. | Do. |
| 32 | 4-methyl-3-amino-benzoic acid. | 2-hydroxy-3-naphthoic-acid-3'-carboxy)-phenylamide. | 2:5-dichloro-4-benzoylamino-1-aminobenzene. | Red. |

*Example 2*

5.30 parts of the dicarboxylic acid chloride of the formula

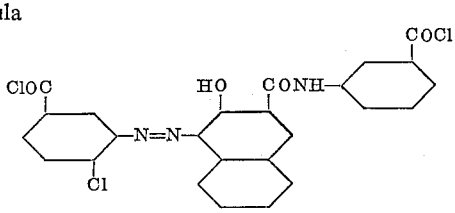

and 5.25 parts of the dicarboxylic acid chloride of the formula

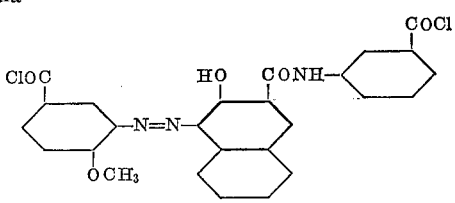

are introduced into 500 parts of ortho-dichlorobenzene at 30° C., while stirring. 12 parts of 2:5-dichloro-4-benzoylamino-1-aminobenzene in 200 parts of ortho-dichlorobenzene are poured in, and the whole is heated at 140–145° C. for 16 hours. The precipitated crystalline pigment is filtered off at 100° C., washed with hot ortho-dichlorobenzene, benzene and methanol, and then dried in vacuo at 70–80° C. A red powder is obtained which is very sparingly soluble in organic solvents and colors polyvinyl chloride foils pure bluish red tints of very good fastness to migration and light.

*Example 3*

65 parts of stabilized polyvinyl chloride, 35 parts of dioctyl phthalate and 0.2 part of the pigment obtained as described in the second paragraph of Example 1 are mixed together, and then worked to-and-fro on a two-roller mill for 7 minutes at 140° C. A scarlet foil is obtained which possesses a very good fastness to light and migration.

What is claimed is:
1. An azo-dyestuff which corresponds to the formula

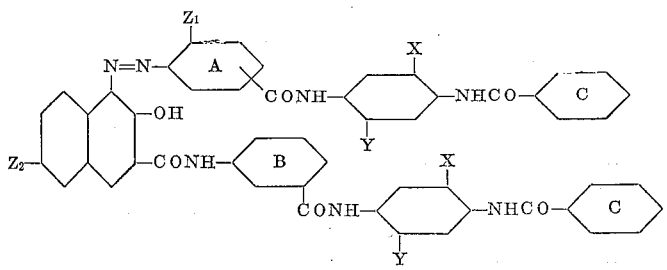

in which $Z_1$ represents a member selected from the group consisting of methyl, methoxy, chlorophenoxy, nitro groups, chlorine and bromine atoms, $Z_2$ a member selected from the group consisting of hydrogen and bromine, X and Y are members selected from the group consisting of hydrogen, chlorine and bromine atoms, and methyl and alkoxy groups containing at most 2 carbon atoms, and in which the —CONH— group in ring A is at least 3 nuclear carbon atoms away from the azo group, and at least 3 nuclear carbon atoms away from $Z_1$, and the benzene nuclei A, B and C may be further substituted by chlorine atoms.

2. The dyestuff of the formula

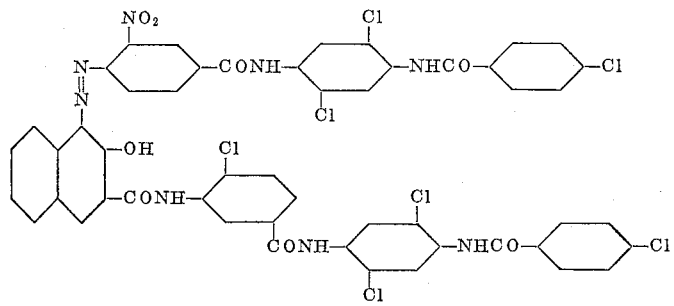

3. The dyestuff of the formula

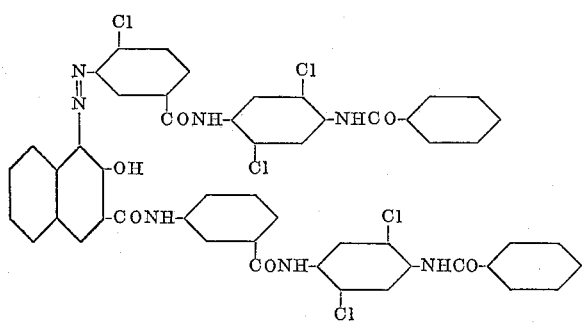

4. The dyestuff of the formula

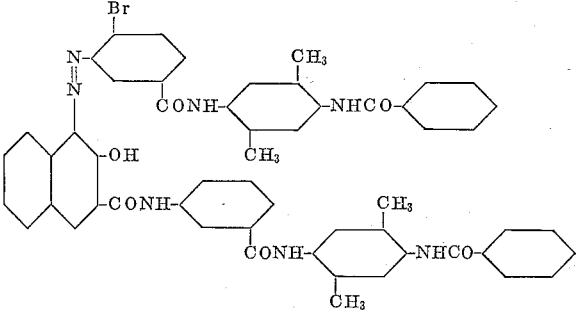

5. The dyestuff of the formula

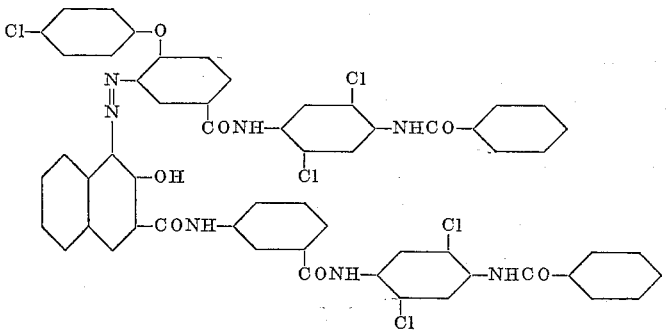

6. The dyestuff of the formula

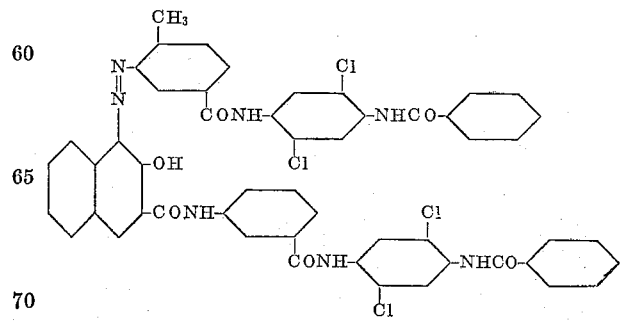

No references cited.